United States Patent [19]

Lynch et al.

[11] Patent Number: 5,164,754
[45] Date of Patent: Nov. 17, 1992

[54] CAMERA SHUTTER RELEASE CABLE ADAPTER

[75] Inventors: William P. Lynch, Honeoye Falls; David R. Dowe, Holley; Douglas T. Moran, Rochester, all of N.Y.

[73] Assignee: Eastman Kodak Company, Rochester, N.Y.

[21] Appl. No.: 747,817

[22] Filed: Aug. 20, 1991

[51] Int. Cl.⁵ .............................. G03B 17/38
[52] U.S. Cl. .................................... 354/269
[58] Field of Search ............ 354/266, 267.1, 268, 354/269, 290, 295

[56] References Cited

U.S. PATENT DOCUMENTS

| | | | |
|---|---|---|---|
| 4,030,112 | 6/1977 | Morse et al. | 354/269 |
| 4,167,317 | 9/1979 | Kowamura | 354/269 |
| 4,293,210 | 10/1981 | Kando et al. | 354/269 |

Primary Examiner—Michael L. Gellner
Assistant Examiner—David M. Gray
Attorney, Agent, or Firm—Francis H. Boos, Jr.

[57] ABSTRACT

A shutter release cable adapter for connection to a mechanical shutter release of a film camera is provided with a bi-stable magnetic device to selectively position an internal shutter release plunger to either a translation blocking or unblocking position depending on an operating condition of the image capture system of which the film camera is a part. The magnetic device includes an electromagnet responsive to a system condition signal to generate a reversible magnetic field and a permanent magnet interactive with the electromagnetic field to position a projection mounted on the internal plunger to the respective blocking or unblocking position as determined by the condition of the image capture system. In the absence of an electromagnetic field the permanent magnet retains its assumed position by attraction of the permanent magnet field to the armature poles of the electromagnet.

7 Claims, 6 Drawing Sheets

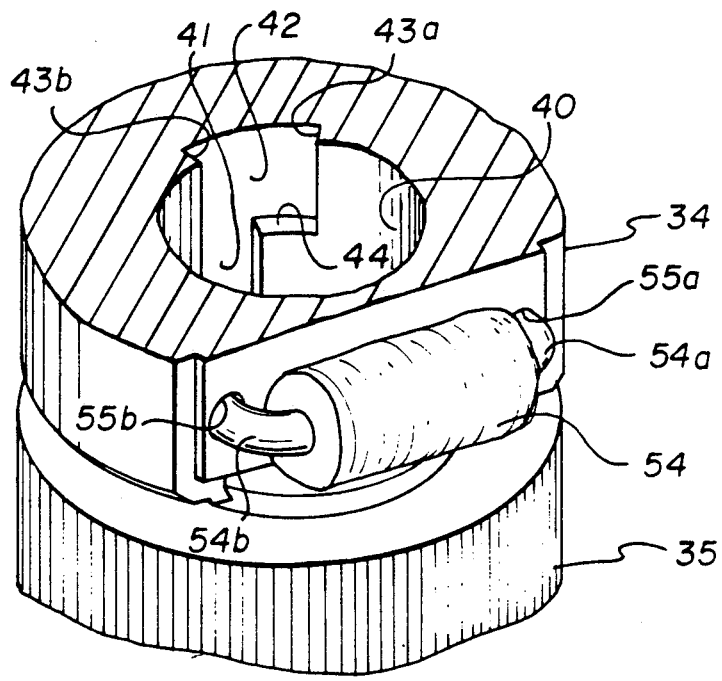
FIG. 4
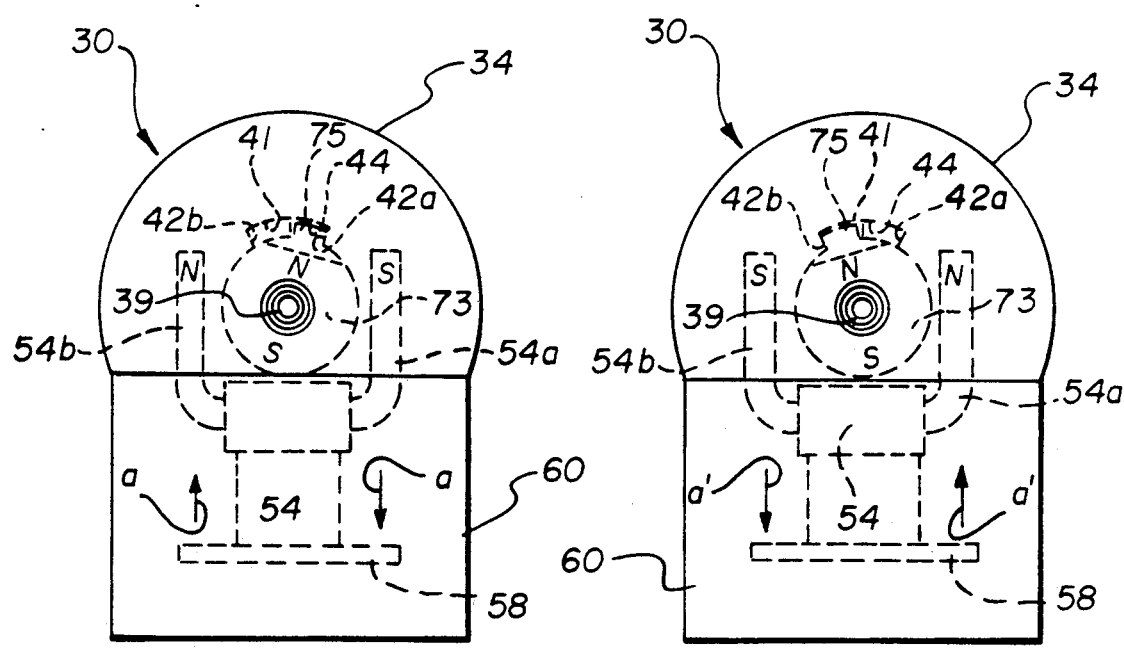
FIG. 5A  FIG. 5B

CAMERA SHUTTER RELEASE CABLE ADAPTER

FIELD OF INVENTION

This invention relates to the field of photographic cameras, and more specifically to camera shutter release cable adapter apparatus useful in dual image simultaneous capture systems.

BACKGROUND OF INVENTION

Simultaneous recording of photographic film and electronic video images is now well known in the portrait photography art. The recorded video images are typically used as electronic "proofs" of the picture composition before incurring the expense of developing and printing the photographic negatives. A system of this type is shown and described in commonly assigned U.S. Pat. No. 4,805,037 - Noble et al. In general, with such systems, the taking of a picture is initiated by the photographer actuating a shutter release cable which is coupled to the film camera. When this is done, the camera generates a synchronizing signal, typically a flash request signal, which is coupled to an image controller means to synchronize operation of the film camera and flash with the video portion of the system.

A difficulty may be encountered with systems of this type in that, unless precautions are taken, it is sometimes possible to initiate the taking of a picture with the film camera and to activate the flash without simultaneously capturing the video image. This can occur when the video portion of the system is "busy" which may be characterized as any condition that prevents the processing of new video information from the video camera. Examples of conditions that would prevent the taking of a picture might be that there is no floppy disk in the video image recorder unit, or a malfunction has occurred in the video portion of the system, or image information from a previous picture is still being processed and recorded, or simply that the recording disk is full. It is possible, therefore, for the photographer to attempt to take a picture or a series of pictures in sequence, and fail to capture and record some or all of the video images without realizing it until it is too late.

With photographic cameras that utilize electrically operated shutter releases it is known to provide electronic shutter release control signals that inhibit the application of a shutter release signal to the film camera and generation of the flash request signal until an enable signal or "all clear" signal is received from the video image recording apparatus. However, for cameras with mechanical shutter release apparatus, there has not been available a simple, small, relatively inexpensive mechanism that would provide the feature of inhibiting film camera shutter release until the video apparatus is ready to record the next image.

It is therefore an object of the present invention to provide a simple, small and inexpensive camera shutter cable release adapter that is useful with cameras having mechanical lens shutter releases.

SUMMARY OF INVENTION

Thus in accordance with the invention, there is provided a shutter release cable adapter for use with a mechanical shutter release of a film camera in an image capture system, wherein the cable adapter comprises a body portion having an input adapted to receive a plunger of an external shutter release cable, an output adapted for connection to a mechanical shutter release terminal of the film camera and an internal cavity extending between said input and output, the cavity having plunger translation blocking and unblocking locations and further comprises an internal plunger translatably mounted in the cavity and adapted to convey motion of the external shutter release plunger to the camera shutter release, the internal plunger having a movable projection positionable in either of said blocking or unblocking locations. The adapter also includes means for supplying an input electrical signal representative of an operating condition of the image capture system and further includes a plunger translation control means comprised of a two-position magnetic device responsive to said input signal for moving said movable projection to either of said blocking or unblocking locations in the body portion depending on the operating condition of the image capture system.

In a preferred form of the invention, the cavity comprises a central bore axially aligned with the input and output of the body portion and is provided with an expanded recess section including the blocking location which is axially terminated by a blocking shoulder and, rotationally displaced therefrom, the unblocking location which communicates with an elongated, axially extended groove formed in the outer periphery of the central bore. Additionally, the magnetic device comprises a bistable rotatable device including a rotatable permanent magnet mounted on the internal plunger and an electromagnet coupled to the signal supply means. The permanent magnet is mechanically coupled to the projection which extends radially from the internal plunger. The permanent magnet is nested between the armature legs of the electromagnet so as to be rotationally driven by the electromagnetic field to assume a position in which the projection is aligned with either the blocking or unblocking location of the recess depending on the direction of the electromagnetic field as determined by the input signal. When the input signal is removed, the magnet retains its assumed position by virtue of the interaction of the permanent magnet field with the armature legs of the electromagnet.

BRIEF DESCRIPTION OF DRAWINGS

In the drawings:

FIG. 4 is a cutaway perspective view of a portion of the cable adapter of FIG. 2.

FIGS. 5a and 5b are diagrammatic end views of the FIG. 2 cable adapter useful in explaining the operation of the invention.

DETAILED DESCRIPTION

Figure 1:
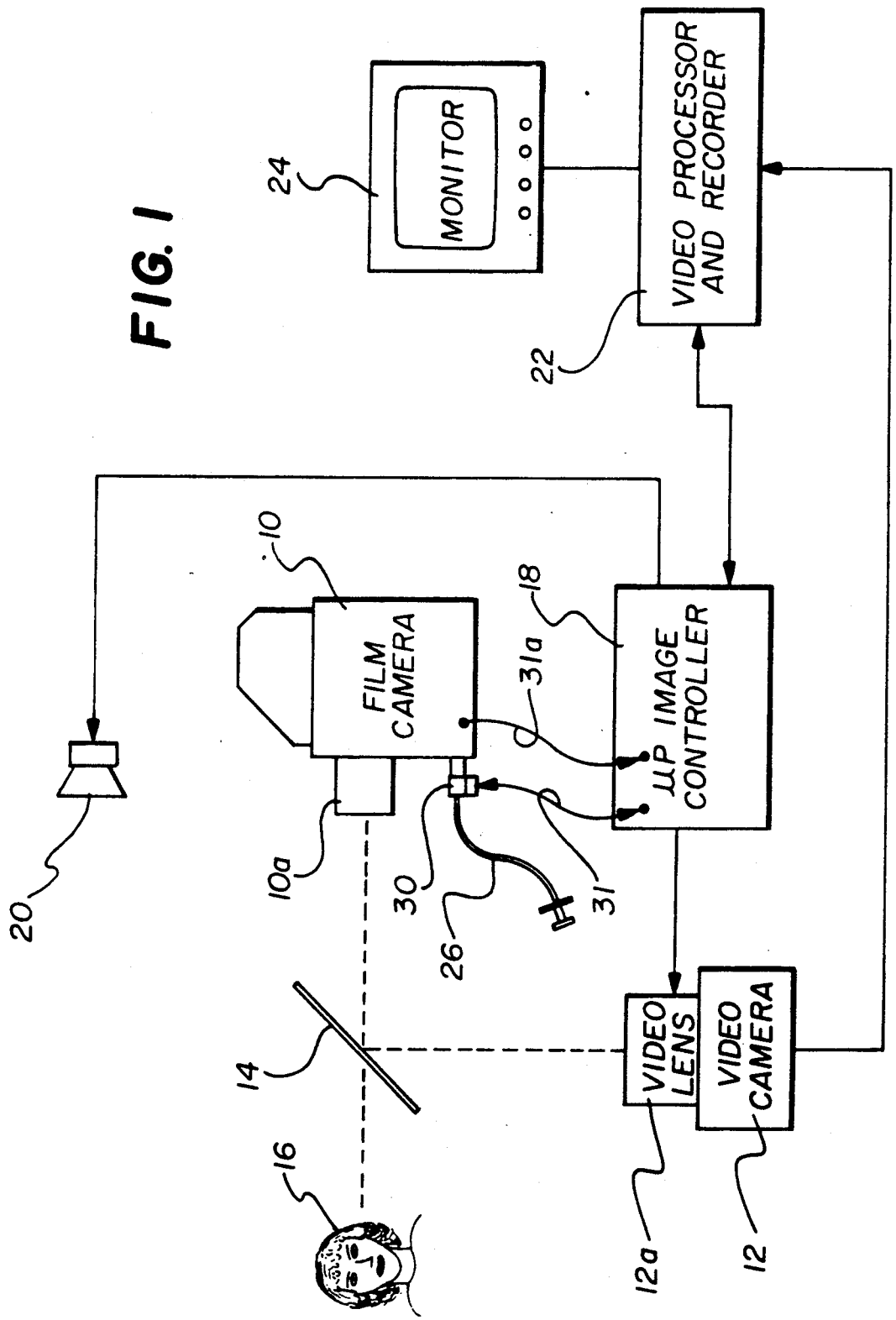
FIG. 1 is schematic illustration of a simultaneous image capture system comprised of video camera with a film camera utilizing the cable adapter apparatus of the present invention.

In FIG. 1, a simultaneous image capture system is shown comprising a film camera 10 having a taking lens 10a and a video camera 12 with a video lens 12a. Lenses 10a and 12a are simultaneously focussed through a beam splitter 14 on a subject 16. A microprocessor-based image controller 18 is included in the system to provide a variety of control functions, among them being control of video lens 12a to stop down the video lens shutter in association with the opening of the film camera lens 10a as a picture is being taken. Image controller 18 also operates in response a flash request signal on line 31a from camera 10 to synchronize the actuation of flash apparatus 20 with the operation of the two camera lenses. Image controller 18 additionally controls the operation of video processor and recorder unit 22 which processes the video signal from camera 12 for presentation on a video monitor 24 and "grabs" an image frame corresponding to the picture being taken for permanent recording on a suitable recording medium, such as a floppy disk. A system of the type shown in FIG. 1 is described in greater detail in the aforementioned U.S. Pat. No. 4,805,037, the disclosure of which is incorporated herein by reference, and it is therefore not believed necessary to repeat the details thereof at this time.

A conventional shutter release cable 26 is coupled to film camera 10 via a cable adapter 30, to be described in more detail subsequently, to allow the photographer to open film shutter 10a thereby initiating the taking of a picture. The activation of the shutter release is sensed in adapter 30 and a signal is sent to image controller 18 via line 31. If, for any of a variety of reasons, the video portion of the system is not ready for the taking of a picture, referred to hereinafter for convenience as a "system busy" condition, image controller 18 responds to the signal from cable adapter 30, in accordance with a feature of the invention, to sound an audible alarm such as a buzzing sound to alert the user to the fact that a picture cannot be taken at this time. Additionally, controller 18 may also send a video message to monitor 24 to further alert the user to the condition of the system. At the same time, image controller 18 sends a "system busy" signal on line 31 to cable adapter 18 to cause the adapter to be effective to physically block the passage of the shutter release cable plunger from actuating the film camera shutter thereby preventing the taking of a picture. Image controller 18 continuously monitors the condition of the system electronics to determine when the taking of a picture is to be prevented.

Assuming that the condition of the system is such as to allow the taking of a picture, cable adapter 30 is responsive to signals on line 31 from controller 18 indicating that the system is not busy to thereby allow the shutter release plunger to actuate the film camera shutter and to send a synchronizing signal via line 31a to image controller 18 to synchronize operation of the flash 20 and the video camera 12 with the film camera 10.

Figure 2:
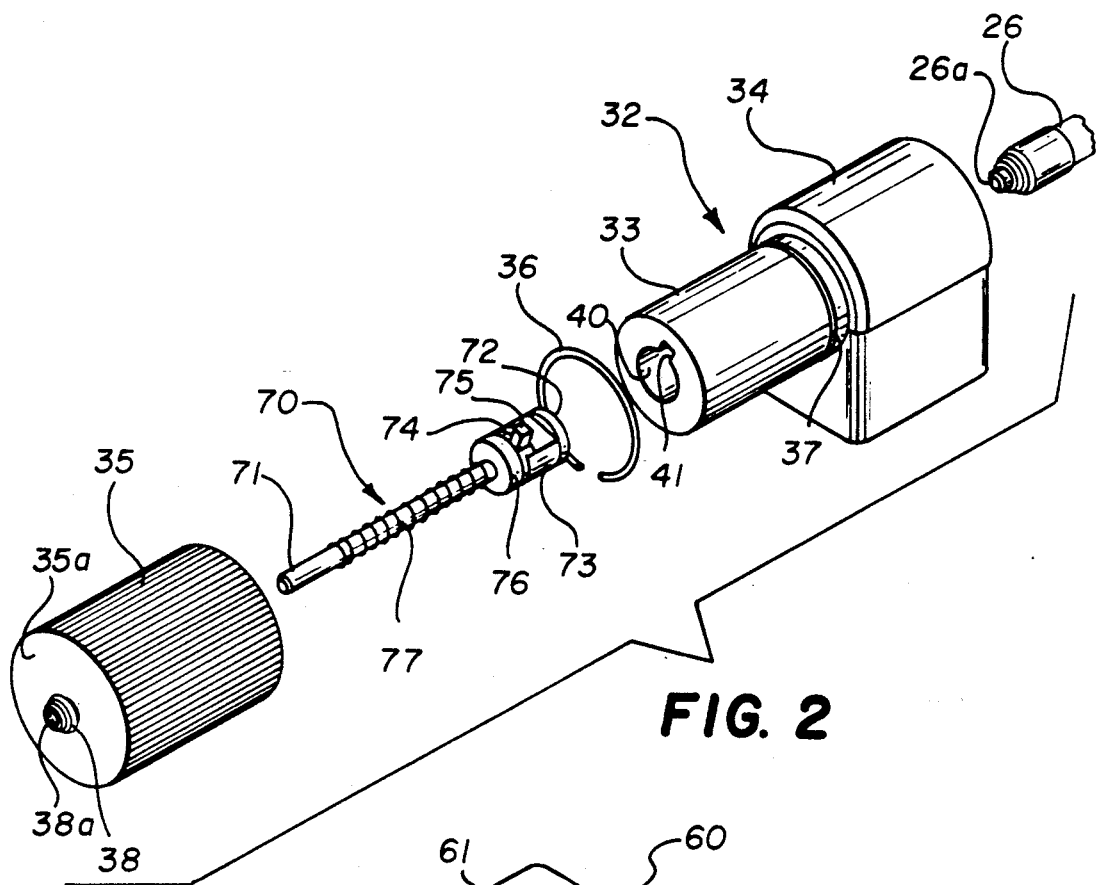
FIG. 2 is an exploded perspective view of cable adapter apparatus of the present invention.
Figure 3:
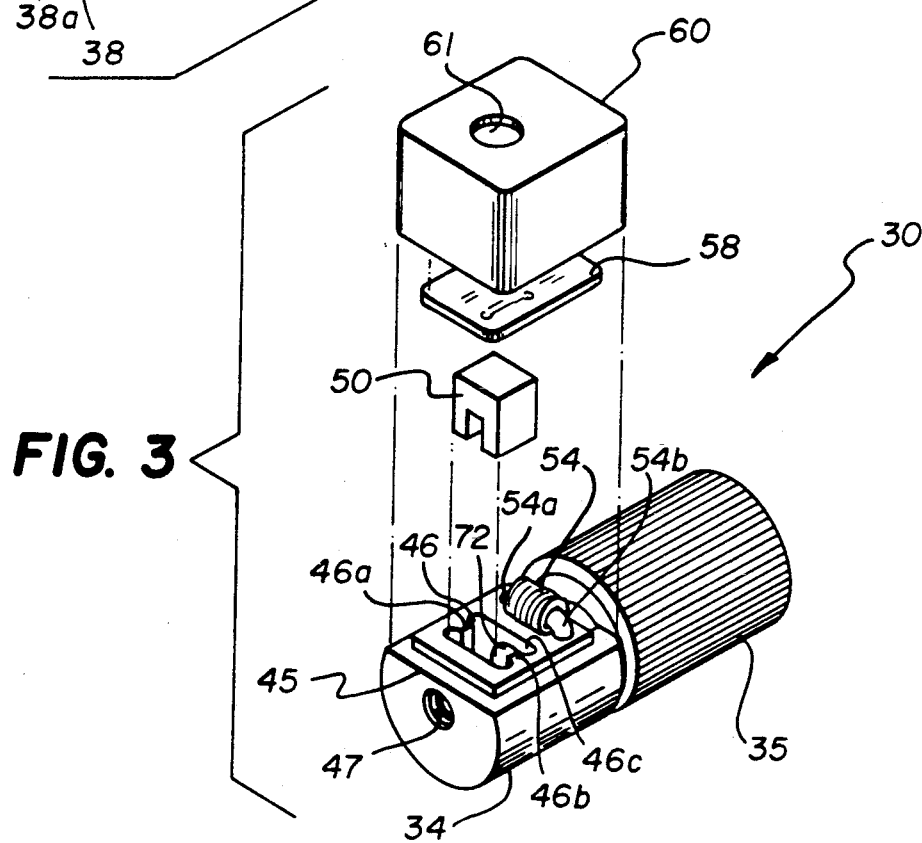
FIG. 3 is another exploded view of the cable adapter of FIG. 2.

Referring now to FIGS. 2–4, a preferred embodiment of cable adapter 30 constructed in accordance with the present invention is shown as comprising a generally cylindrical main body portion 32 having a first, reduced diameter cylindrical section 33 and a larger diameter section 34. The larger diameter section 34 is provided with a conical, female threaded input 39 (FIG. 5a) adapted to receive a plunger 26a of a conventional shutter release cable 26. A knurled cap 35 is adapted to fit over section 33 and is held rotatably in place by means of a split ring 36 which mates with a groove 37 in section 33 and a corresponding groove (not shown) inside cap 35. A conical, male threaded shutter release connector 38 having an axial hole 38a is provided on end 35a of cap 35 and forms an output of adapter 30 for connection to the conventional mechanical shutter release input terminal of a film camera. The smaller cylindrical section 33 is provided with a cavity, such as an elongated central bore 40 which is axially aligned with input 39 and output 38 and extends into the larger cylindrical section 34. A slot or groove 41 formed in the circumference of bore 40 extends axially the length of bore 40 and terminates at an expanded recess 42 which is formed approximately halfway into the larger diameter section 34 of the adapter 30. For reasons to be explained subsequently, recess 42 is provided with rotational limit shoulders 43a, 43b and an axial blocking shoulder 44.

An internal plunger 70 mounted inside of bore 40 is comprised of an elongated rod 71 terminating at the end remote from camera connector 38 in a disk or end cap 72 integrally formed on the end of rod 71. A cylindrical permanent magnet 73 and a disk 74 provided with a radially extending projection 75 are sandwiched between end cap 72 and a retainer disk 76. It will be noted that disk 74, on which projection 75 is formed, has a flat bearing surface that mates with a flattened surface of magnet 73 thereby to provide a mechanical coupling between the two that causes projection 75 to rotate with rotation of the magnet 73. Plunger 70 is adapted to fit axially within bore 40 with disk 74 being rotatable or pivotable about the bore axis such that projection 75 can be aligned alternatively with either slot 41, representing a translation unblocking (enabling) location in the adapter, or with a rotationally displaced shoulder 44 in expanded recess 42, representing a translation blocking location in the adapter. A compression spring 77 biases plunger 70 to the right, as seen in FIG. 2, such that end cap 72 is flush with the side wall 46c of a hollowed out section 46 as seen in FIG. 3. It will be apparent from the foregoing that when projection 75 is aligned with slot 41, plunger 70 is free to translate axially along bore 40 in response to pressure from cable plunger 26a thereby enabling rod 71 to project through the hole 38a of the adapter to trip the shutter release of the attached camera. Conversely, when projector 75 is aligned with shoulder 44, axial translation of plunger 70 is prevented.

When plunger 70 is biased to its normal position with end cap 72 flush with the opening to the hollowed section 46, cylindrical magnet 73 and disk 74 reside within recess section 42 and are freely rotatable between either of the blocking or unblocking locations as just described. Rotation or pivoting of magnet 73 and disk 74 is controlled by plunger translation control means comprising a two-position magnetic device including permanent magnet 73 and an electromagnet 54 which together form a bistable control unit responsive to the input signal from line 31 and circuit board 58 for moving projection 75 to either of the blocking or unblocking locations depending on the operating condition of the image capture system. Electromagnet 54 includes a generally U-shaped armature having legs 54a and 54b inserted into holes 55a and 55b, respectively, formed on either side of recess 42 so that the armature legs straddle magnet 73 when it resides in recess 42.

Referring to FIGS. 5a and 5b, in the absence of current through the coil of electromagnet 54, permanent magnet 73 will seek to rotate and align its north-south poles with the adjacent ferromagnetic material of armature legs 54a and 54b. The direction of attempted rotation will depend on which side the permanent magnet poles are of the center line between the armature legs. Thus in FIG. 5a, magnet 73 will seek to rotate clockwise but is prevented from completely aligning with the armature legs by virtue of projection 75 pressing against rotation restraining shoulder 42a. In this position, projection 75 is aligned with blocking shoulder 44 and thereby plunger 70 would be prevented from axial translation if external plunger 26a were pushed into the adapter. In FIG. 5b, magnet 73 seeks to rotate counter-clockwise with projection 75 pressed against restraining shoulder 42b and in alignment with slot 41 thereby allowing axial translation of plunger 70 when the external cable plunger is pushed into the adapter. The permanent magnet will hold projection 75 in its assumed position until a current is passed through the coil of electromagnet 54 in a direction that creates an opposing electromagnetic field causing permanent magnet 73 to rotate in the reverse direction in an attempt to realign its field with the newly established electromagnetic field between the armature legs. Thus, in FIG. 5a, current in a direction shown by the arrows, a, causes the north pole of magnet 73 to seek the south pole of armature leg 54a. If the current is later reversed, as shown by arrows, a', in FIG. 5b, magnet 73 reverses its attempted rotation and again seeks to align its north pole with the electromagnet south pole of armature leg 54b. When the coil current is discontinued, magnet remains in its existing assumed position by action of the permanent magnet field on the armature legs as described above. Thus a very simple and inexpensive device is provided for physically blocking or enabling the passage of the shutter release plunger 70 in response to an appropriate current pulse applied to the electromagnet coil.

In addition to electromagnet 54, section 34 of the adapter further includes a conventional U-shaped opto-sensor 50 held in position within the hollowed out section 46 by ribs 46a,46b with the downwardly extending legs of the opto-sensor straddling the central axis of the section 34. One leg of opto-sensor 50 contains a light source and the other leg contains a photosensor adapted to receive the light from the light source. The arrangement of opto-sensor 50 within section 34 is such that when the plunger of cable 26 is inserted into adapter 30 to initiate the taking of a picture, the plunger travels between the legs of opto-sensor 50 to prevent the light from the light source from reaching the photosensor thereby generating a signal indicating the presence of the cable plunger in the adapter.

Figure 6:
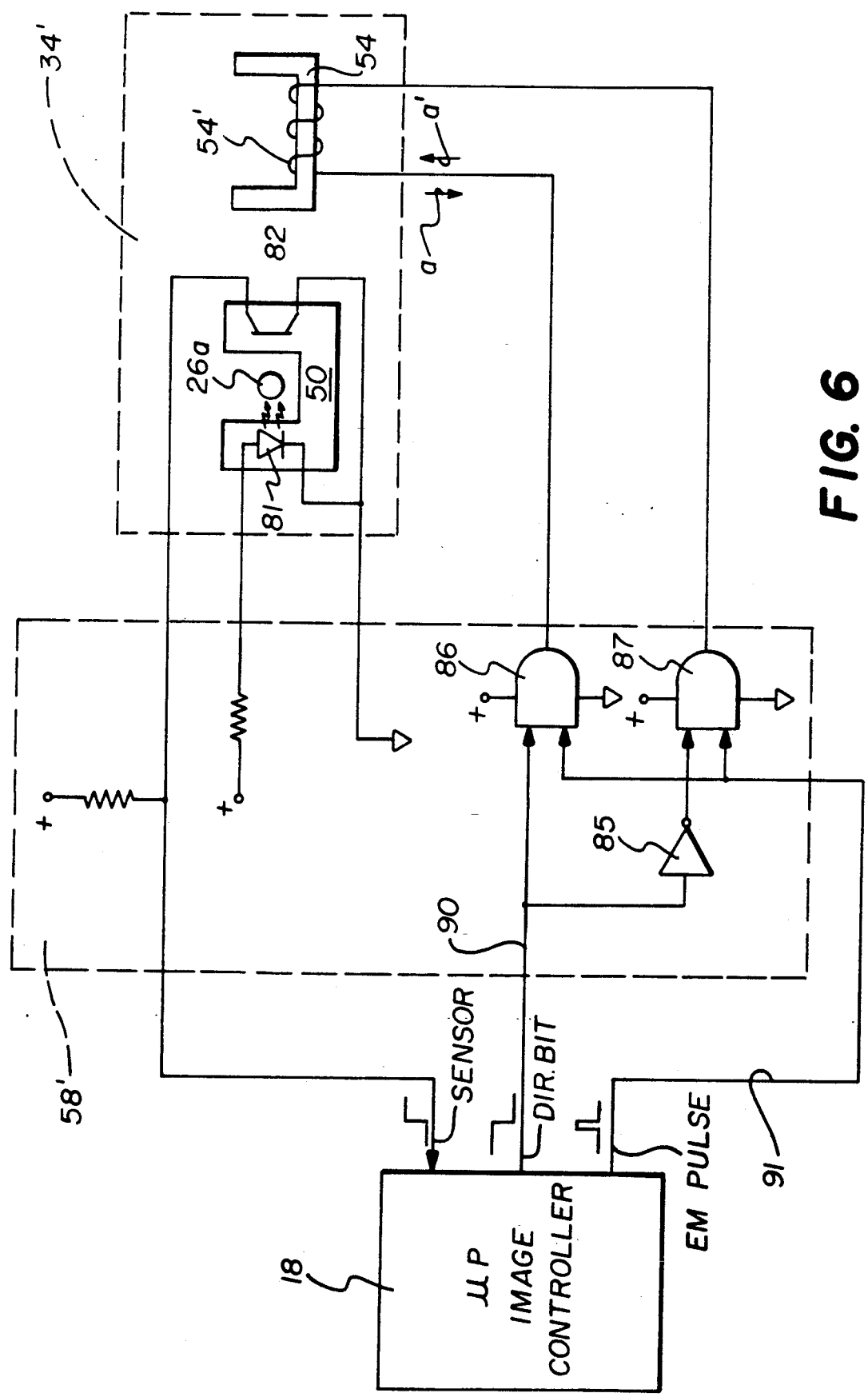
FIG. 6 is a schematic diagram of a control circuit useful in the cable adapter of the invention.

Turning now to FIG. 6, a circuit suitable for control of the bistable condition of adapter 30 is shown in which the portion of the adapter including opto-sensor 50 and electromagnet 54 is designated with the reference numeral 34' and the control circuit by the reference numeral 58'. There are essentially two functions which are performed by the adapter 30 and control circuit 58' in conjunction with the microprocessor image processor 18. One is to sense when the photographer is initiating the taking of the picture and the other is to perform a blocking operation to physically block the taking of the picture if system conditions so warrant. The first function is performed by the opto-sensor 50. Normally, when the space between light emitter 81 and photosensor 82 is empty, the light impinging on the base of the photosensor causes it to conduct thereby sending a low condition signal to processor 18. When external plunger 26a enters the opto-sensor space between light source 81 and photosensor 82, the light is blocked and the photosensor turns off thereby sending a high condition signal to processor 18 to indicate that a picture is about to be taken. If for any of the reasons discussed previously, a picture should not be taken, processor 18 is programmed to provide a warning to the photographer to alert the photographer to the fact that a picture should not be taken. This warning can be an audible warning, such as a buzzing sound or it can be in the form of an error message displayed on the video monitor or both. The error message can indicate the nature of the problem, such as "disk full" so as to allow the photographer to correct the problem and continue with the picture taking session.

A second function to be performed is responding to a busy condition of the system to move projection 75 to the plunger blocking position thereby preventing actuation of the film camera shutter release. To this end bidirectional current control circuit 58' is provided which is comprised of a pair of AND circuits 86,87 and inverter circuit 85. A signal (DIR BIT) representing the direction of current flow through electromagnet coil 54' is supplied on line 90 from image controller 18 to a first input side of AND circuit 86 and via inverter circuit 85 to a first input side of AND circuit 87. An electromagnet coil current pulse (EM PULSE) is supplied on line 91 from image controller 18 simultaneously to second input sides of both AND circuits 86,87. Image controller 18 is programmed so that each time the level of the DIR BIT signal changes in response to a change in the condition of the image capture system, an EM PULSE signal is output on line 91. If it is assumed that a not busy condition of the system is represented by a high level of the DIR BIT signal, then when the system outputs a "busy" condition signal to controller 18, the DIR BIT drops to a low level and an EM PULSE is sent to the AND circuits. The resulting coincidence of high inputs to AND circuit 87 causes current to flow momentarily through coil 54' in the direction of arrow "a" which, in turn, causes magnet 73 to rotate and assume the plunger blocking position illustrated FIG. 5a. When the system later outputs a "not busy" condition signal to controller 18, the DIR BIT signal rises to a high level and an EM PULSE is again sent to the AND circuits. The resulting coincidence of high inputs to AND circuit 86 causes a reverse current to flow momentarily through coil 54' in the direction of arrow, a', thus rotating magnet 73 to the unblocking position shown in FIG. 5b and thereby allowing actuation of the film camera shutter whenever the external cable release is pressed by the photographer.

Figure 7:
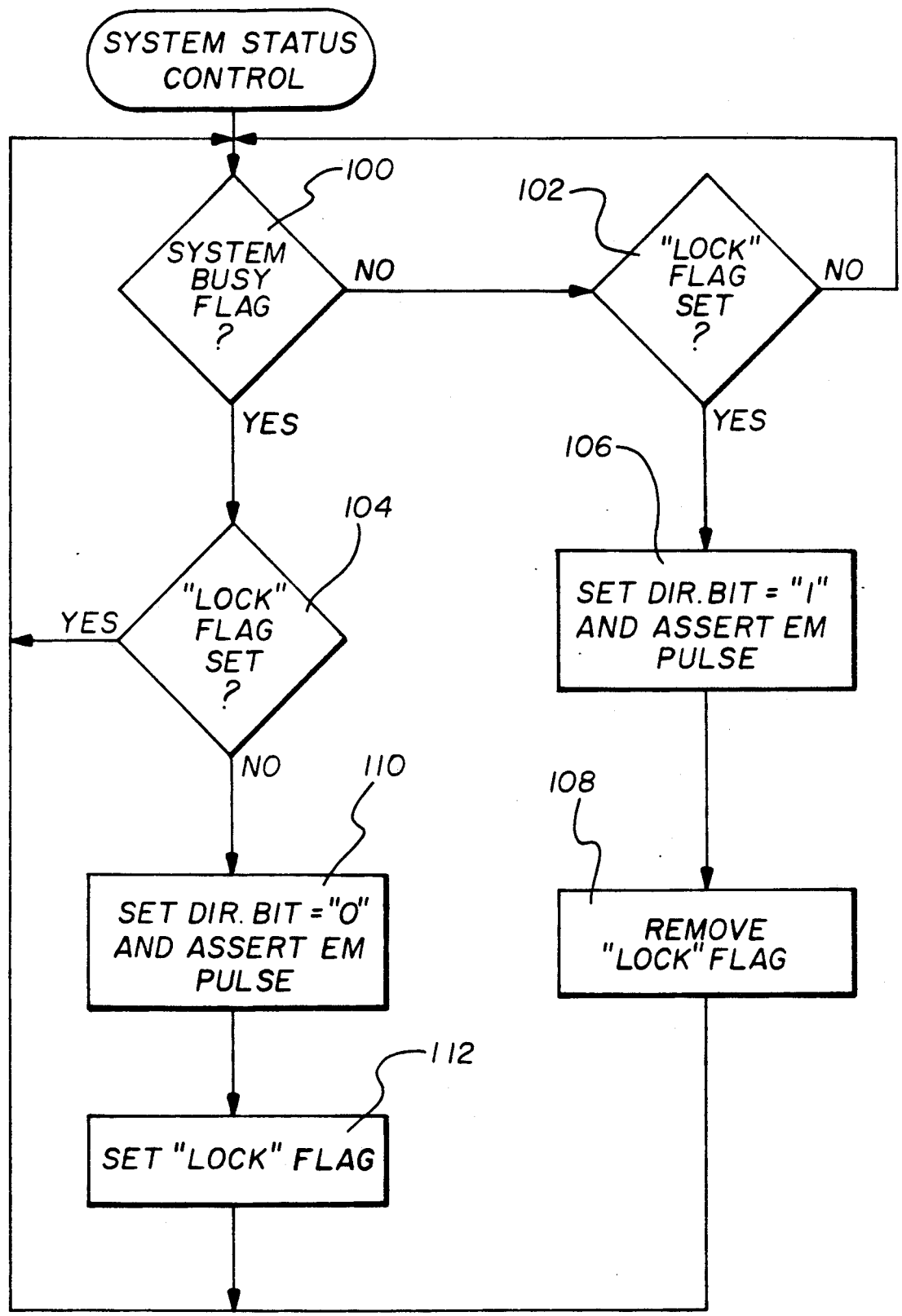
FIG. 7 is a program flow chart used in the image controller of the system of FIG. 1 to control the function of the FIG. 2 cable adapter.

Turning now to FIG. 7, there will now be considered the manner in which image controller 18 is programmed and operated to respond to system condition information for use in controlling the cable adapter. System status control first checks at 100 to determine if a system busy flag is set and, if not, then checks at 102 to determine the condition of the lock flag (indicative of whether the cable adapter 30 is in the blocked or unblocked condition) and, if not (i.e. the adapter is unblocked), continues to loop back through these checks until a system busy flag is detected at 100. In this loop, the system is prepared to accept the taking of a picture and the photographer can trigger the film camera in normal manner.

If the system busy flag is set and enquiry 104 determines the lock flag is set (i.e. adapter is blocked), the controller continues to loop through enquiries 100 and 104 with the system being prevented from the taking of a picture. Once the system busy flag is removed, the controller branches through enquiry 102 to instruction 106. This instruction causes the DIR BIT to be set to a "1" (high level) and the EM PULSE to be asserted thus causing magnet 73 to rotate to the unblocked position after which instruction 108 removes the lock flag setting. If the controller determines in enquiries 100 and 104 that the system is busy but the adapter is unblocked, instruction 110 causes the DIR BIT to be set to "0" (low level) and asserts the EM PULSE to cause magnet 73 to rotate to the blocked position. Following this, instruction 112 sets the lock flag and the controller loops through enquiries 100 and 104 with picture taking prevented.

Figure 8:
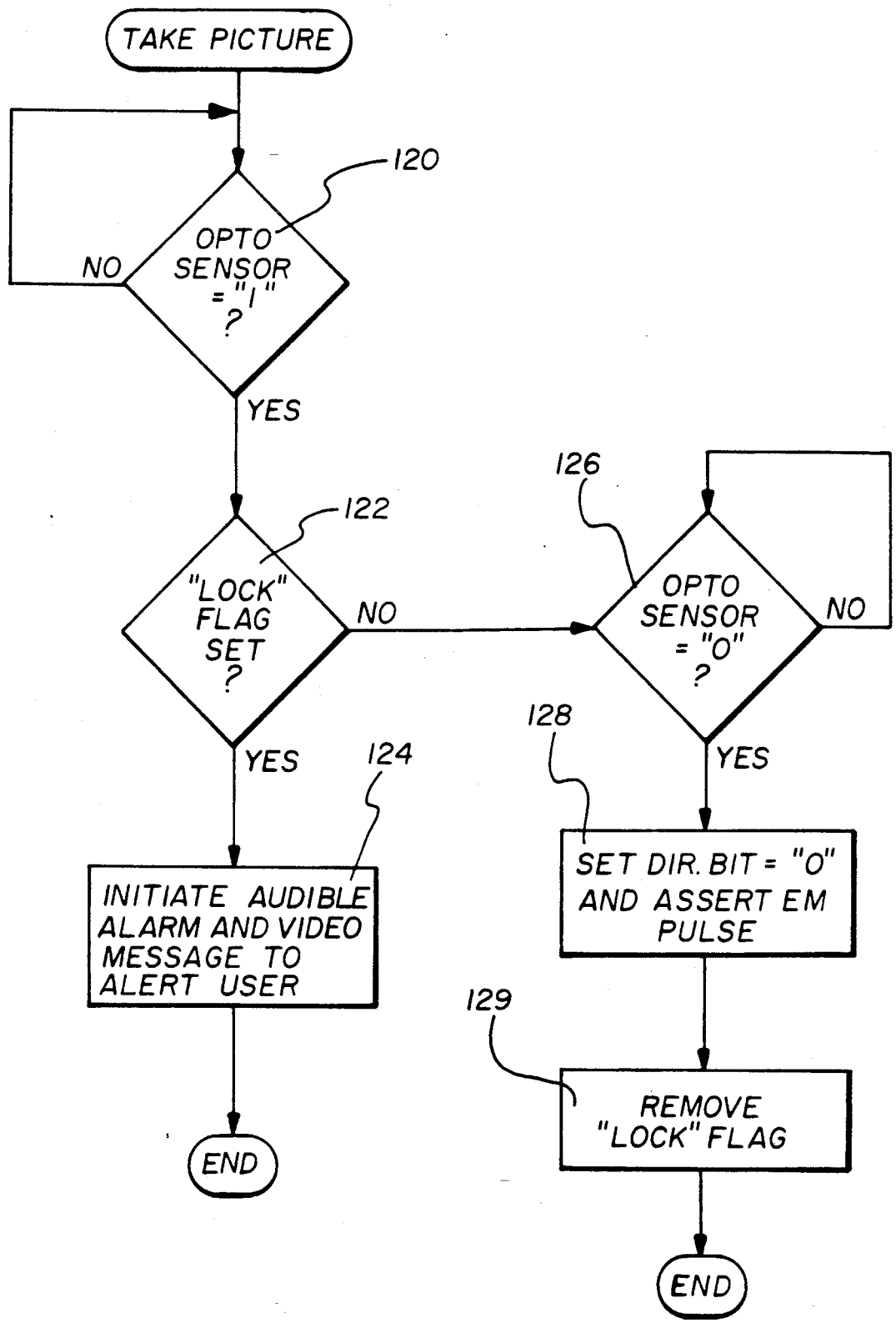
FIG. 8 is another program flow chart for the image controller used in the operation of the FIG. 2 cable adapter.

Considering now FIG. 8, the manner in which controller 18 is programmed to operate in the picture taking mode will be explained. In this mode, first enquiry 120 checks the output of opto-sensor 50 and if it is set to a "1", indicating that external cable plunger 26a is being pressed into the adapter, enquiry 122 checks the lock flag setting. If the flag is set (i.e. the magnet 73 is in the blocked position) instruction 124 issues an audible alarm and causes a video message to be displayed on the video monitor. If the adapter is not blocked, the output of opto-sensor remains at "1" until cable plunger 26a pulls back out of the adapter. When this is determined by enquiry 126, instruction 128 sets the DIR BIT to a "0" and asserts the EM PULSE to cause magnet 73 to move to the blocking position after which instruction 129 sets the lock flag. This is to ensure that the photographer does not attempt to take a series of pictures in rapid succession before the video portion of the image capture system has had a chance to finish processing the picture information just taken.

The invention has been described in detail with particular reference to a presently preferred embodiment, but it will be understood that variations and modifications can be effected within the spirit and scope of the invention.

What is claimed is:

1. A shutter release cable adapter for use with a mechanical shutter release of a film camera in an image capture system, the cable adapter comprising:
    a body portion having an input adapted to receive a plunger of an external shutter release cable, an output adapted for connection to a mechanical shutter release terminal of the film camera and an internal cavity extending between said input and output, said cavity having plunger translation blocking and unblocking locations;
    an internal plunger translatably mounted in the cavity and adapted to convey motion of the external shutter release plunger to the camera shutter release, said internal plunger having a movable projection positionable in either of said blocking or unblocking locations;
    means for supplying an input electrical signal representative of an operating condition of the image capture system;
    and plunger translation control means including a two-position magnetic device responsive to said input signal for moving said movable projection to either of said blocking or unblocking locations of the body portion depending on the operating condition of the image capture system.

2. The adapter of claim 1 in which said magnetic device is a bi-stable device comprised of an electromagnetic and a permanent magnet.

3. The adapter of claim 1 in which said magnetic device is comprised of an electromagnet coupled to said input signal supply means for producing an electromagnetic field in said cavity and a permanent magnet mechanically coupled to said projection on said internal plunger, said magnet being located in the cavity within said electromagnetic field and being movable so as to assume one of two positions dependent on the direction of said electromagnetic field.

4. The adapter of claim 3 wherein said magnetic device is a bi-stable device in which said magnet retains its assumed position in the absence of an active electromagnetic field.

5. The adapter of claim 3 wherein said electromagnet is comprised of a U-shaped armature having legs disposed on opposite sides of said cavity for producing an electromagnetic field through the cavity in a direction determined by said electrical signal and wherein said permanent magnet is rotatably mounted on said internal plunger so as to rotatably position said projection in either one of said translation blocking and unblocking locations depending on the direction of said electromagnetic field.

6. The adapter of claim 3 wherein said cavity is comprised of a central bore extending axially of said body portion between said input and output, said bore having an expanded recess section comprised of a first location terminated axially by a blocking shoulder and a second location communicating with an axially extending elongated groove formed in the outer circumference of the bore; and wherein said internal plunger is axially translatable through said bore when said projection is aligned with said groove and is prevented from axial translation when said projection is aligned with said blocking shoulder.

7. The cable adapter of claim 6 wherein said permanent magnet and projection are mounted on said internal plunger for rotation about said bore axis between said blocking shoulder and said groove in response to action of said electromagnetic field.

* * * * *